(12) United States Patent
Xiong et al.

(10) Patent No.: US 11,563,610 B2
(45) Date of Patent: Jan. 24, 2023

(54) SYNCHRONIZATION SIGNAL BLOCK PATTERN AND DEMODULATION REFERENCE SIGNAL DESIGN FOR PHYSICAL BROADCAST CHANNEL FOR CHANNEL FREQUENCIES ABOVE 52.6GHZ

(71) Applicant: Intel Corporation, Santa Clara, CA (US)

(72) Inventors: Gang Xiong, Portland, OR (US); Gregory V. Morozov, Nizhny Novgorod (RU); Jie Zhu, San Jose, CA (US); Yushu Zhang, Beijing (CN); Dae Won Lee, Portland, OR (US)

(73) Assignee: Intel Corporation, Santa Clara, CA (US)

(*) Notice: Subject to any disclaimer, the term of this patent is extended or adjusted under 35 U.S.C. 154(b) by 16 days.

(21) Appl. No.: 17/252,959

(22) PCT Filed: Sep. 20, 2019

(86) PCT No.: PCT/US2019/052220
§ 371 (c)(1),
(2) Date: Dec. 16, 2020

(87) PCT Pub. No.: WO2020/016494
PCT Pub. Date: Mar. 26, 2020

(65) Prior Publication Data
US 2021/0160117 A1  May 27, 2021

Related U.S. Application Data

(60) Provisional application No. 62/818,369, filed on Mar. 14, 2019, provisional application No. 62/733,953, filed on Sep. 20, 2018.

(51) Int. Cl.
*H04L 27/26* (2006.01)
*H04J 11/00* (2006.01)
(Continued)

(52) U.S. Cl.
CPC ...... *H04L 27/2602* (2013.01); *H04J 11/0073* (2013.01); *H04J 11/0076* (2013.01);
(Continued)

(58) Field of Classification Search
CPC ............ H04L 27/2636; H04L 27/2607; H04L 5/0048; H04L 27/2602; H04L 27/261;
(Continued)

(56) References Cited

U.S. PATENT DOCUMENTS

2018/0262313 A1   9/2018  Nam et al.
2018/0287840 A1*  10/2018  Akkarakaran ...... H04L 27/2692
(Continued)

FOREIGN PATENT DOCUMENTS

WO   2018084571 A1   5/2018
WO   2018144337 A1   8/2018

OTHER PUBLICATIONS

PCT International Preliminary Reporton Patentability issued in PCT/US2019/052220, dated Apr. 1, 2021; 7 pages.
(Continued)

*Primary Examiner* — Candal Elpenord
(74) *Attorney, Agent, or Firm* — Alliance IP, LLC

(57) ABSTRACT

A device of a New Radio (NR) User Equipment (UE), a method and a machine readable medium to implement the method. The device includes a Radio Frequency (RF) interface, and processing circuitry coupled to the RF interface, the processing circuitry to: encode for transmission, to a User Equipment (UE), a Synchronization Signal Block (SSB) including a Physical Broadcast Channel (PBCH) and a channel estimation signal that is time division multiplexed
(Continued)

with the PBCH, the channel estimation signal to allow the UE to estimate a channel for the PBCH and including one of a Secondary Synchronization Signal (SSS), a Demodulation Reference Signal (DMRS) or a Phase Tracking Reference Signal (PT-RS); and apply Discrete Fourier Transform-spread-Orthogonal Frequency Division Multiplexing (DFT-s-OFDM) to the PBCH prior to sending the SSB to the RF interface for transmission.

20 Claims, 12 Drawing Sheets

(51) Int. Cl.
  *H04J 13/00* (2011.01)
  *H04L 5/00* (2006.01)
  *H04W 72/00* (2009.01)
  *H04W 56/00* (2009.01)

(52) U.S. Cl.
  CPC ...... *H04J 13/0025* (2013.01); *H04J 13/0062* (2013.01); *H04L 5/0048* (2013.01); *H04L 5/0051* (2013.01); *H04L 27/261* (2013.01); *H04L 27/2607* (2013.01); *H04L 27/2636* (2013.01); *H04W 56/001* (2013.01); *H04W 72/005* (2013.01)

(58) Field of Classification Search
  CPC . H04L 5/0061; H04J 11/0073; H04J 11/0076; H04J 13/0025; H04J 13/0062; H04W 56/01; H04W 72/005; H04W 72/04; H04W 72/0042
  See application file for complete search history.

(56) References Cited

U.S. PATENT DOCUMENTS

| | | | |
|---|---|---|---|
| 2018/0302182 A1* | 10/2018 | Ly | H04J 11/0076 |
| 2018/0375707 A1* | 12/2018 | Bala | H04L 27/2605 |
| 2019/0109699 A1* | 4/2019 | Liu | H04J 11/0086 |
| 2019/0357159 A1* | 11/2019 | Pan | H04J 11/0076 |
| 2020/0177266 A1* | 6/2020 | Kang | H04W 74/0833 |

OTHER PUBLICATIONS

PCT International Search Report and Written Opinion issued in International Patent Application No. PCT/US2019/052220, dated Jan. 10, 2020; 10 pages.

Qualcomm Incorporated; "DL Signals and Channels for NR-U," R1-1807387, 3GPP TSG RAN WG1 Meeting #93, Busan, Korea; May 2018; 10 pages.

Qualcomm Incorporated; "DL Signals and Channels for NR-U," R1-1809477, 3GPP TSG RAN WG1 Meeting #94; Gothenburg, Sweden; Aug. 2018; 9 pages.

Benedetto, J.J., et al.; "Phase-Coded Waveforms and Their Design. The Role of the Ambiguity Function;" IEEE Signal Processing Magazine, Jan. 2009; 10 pages.

* cited by examiner

SYNCHRONIZATION SIGNAL BLOCK PATTERN AND DEMODULATION REFERENCE SIGNAL DESIGN FOR PHYSICAL BROADCAST CHANNEL FOR CHANNEL FREQUENCIES ABOVE 52.6GHZ

CROSS-REFERENCE TO RELATED APPLICATIONS

This application is a national stage application under 35 U.S.C. § 371 of PCT International Application Serial No. PCT/US2019/052220, filed on Sep. 20, 2019, and entitled "SYNCHRONIZATION SIGNAL BLOCK PATTERN AND DEMODULATION REFERENCE SIGNAL DESIGN FOR PHYSICAL BROADCAST CHANNEL FOR CHANNEL FREQUENCIES ABOVE 52.6 GHZ," which claims the benefit of and priority from U.S. Provisional Patent Application No. 62/733,953 entitled "SSB PATTERN AND DMRS DESIGN FOR PBCH FOR A FREQUENCY ABOVE 52.6 GHZ," filed Thu, Sep. 20, 2018, and from U.S. Provisional Patent Application No. 62/818,369 entitled "SSB PATTERN AND DMRS DESIGN FOR PBCH FOR A FREQUENCY ABOVE 52.6 GHZ," filed Thu, Mar. 14, 2019, the entire disclosures of which are incorporated herein by reference.

FIELD

Various embodiments generally may relate to the field of wireless communications, and particularly to the design of Synchronization Signal Block (SSB) patterns.

BACKGROUND

Current Third Generation Partnership Project (3GPP) New Radio (NR) specifications do not specifically address issues related to the design of SSB patterns and of Physical Broadcast Channel (PBCH) to maintain a low Peak to Average Power Ratio (PAPR) for downlink (DL) transmissions where Discrete Fourier Transform spread Orthogonal Frequency Division Multiplexing (DFT-s-OFDM) is used for the transmission of PBCH.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platforms. The next generation wireless communication system, 5G, or new radio (NR), will provide access to information and sharing of data anywhere, anytime by various users and applications.

Figure 1:
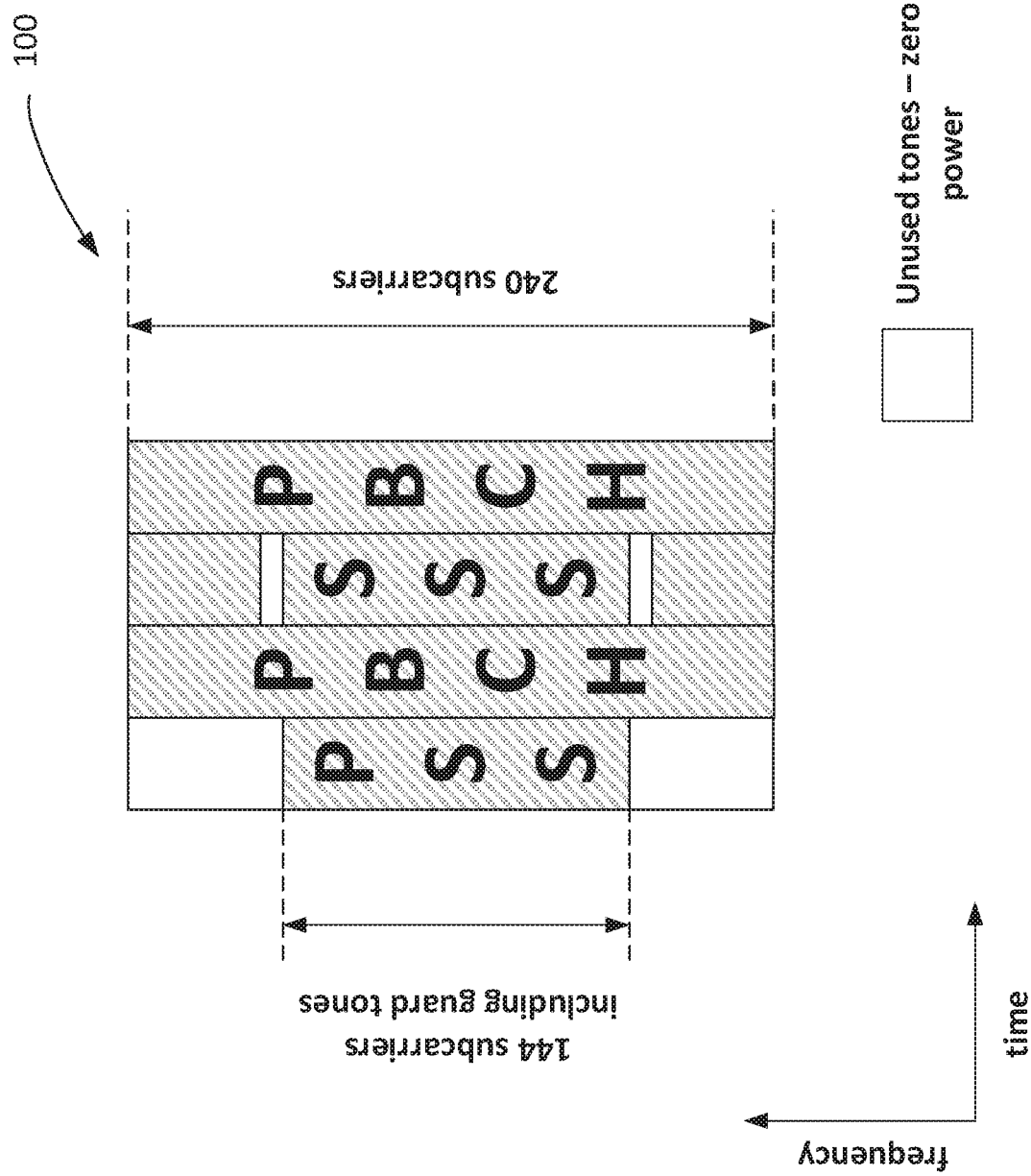
FIG. 1 illustrates a diagram of a SSB pattern according to NR specifications.

In NR, as shown by way of example in FIG. 1, a synchronization signal block (SSB) consists of a primary synchronization signal (PSS), a secondary synchronization signal (SSS), and a physical broadcast signal (PBCH). As shown in FIG. 1, SSB spans 4 symbols in the time domain, and occupies 240 subcarriers (corresponding to 20 physical resource blocks (PRBs)) within one slot, with the SSB symbol order including, in the noted order, PSS, PBCH, SSS and PBCH. Further, PSS and SSS span 1 orthogonal frequency-division multiplexing (OFDM) symbol and occupy 12 PRBs corresponding to 144 subcarriers. PSS is defined based on a length-127 BPSK modulated M-sequence, which is used to provide an OFDM symbol timing estimate, coarse frequency offset estimate and partial cell identification (ID) information. SSS has 1008 sequences and is defined based on length-127 BPSK modulated and XOR of two M-sequence, which is used to provide cell identity.

As shown in the diagram 100, FIG. 1, in NR, PBCH occupies 20 PRBs in frequency in non-SSS OFDM symbols within one SSB. In a SSS OFDM symbol, an additional 8 PRBs are used for PBCH transmission. In particular, PBCH is used to provide timing information including OFDM symbol index, slot index in a radio frame and radio frame number from a SSB. In addition, PBCH is used to carry part of Minimum System Information (MSI), and control configuration information for a Remaining MSI (RMSI).

In NR Release 15, system design is targeted for carrier frequencies up to 52.6 GHz with a waveform choice of cyclic prefix-orthogonal frequency-division multiplexing (CP-OFDM) for downlink (DL) and uplink (UL), and additionally, Discrete Fourier Transform-spread-OFDM (DFT-s-OFDM) for UL. However, for carrier frequency above 52.6 GHz, it is envisioned that single carrier based waveforms are needed in order to handle issues including low power amplifier (PA) efficiency and large phase noise.

For a single carrier based waveform, DFT-s-OFDM and single carrier with frequency domain equalizer (SC-FDE) may be considered for both DL and UL. For an OFDM based transmission scheme including DFT-s-OFDM, a cyclic prefix (CP) may be inserted at the beginning of each block, where the last data symbols in a block is repeated as the CP at the beginning of that block. Typically, the length of a CP exceeds the maximum expected delay spread in order to overcome inter-symbol interference (ISI).

If DFT-s-OFDM is used for the transmission of PBCH in carrier frequencies above 52.6 GHz using a SC based waveform, SSB pattern and PBCH need to be redesigned to keep low PAPR for DL. In this disclosure, we disclose synchronization signal block (SSB) pattern and Demodulation reference signal (DMRS) design for physical broadcast channel (PBCH). In particular, we disclose: (1) Synchronization signal block (SSB) pattern for a DFT-s-OFDM based waveform; (2) DMRS design for PBCH for a DFT-s-OFDM based waveform; (3) SSB pattern for a DFT-s-OFDM based waveform for a frequency above 52.6 GHz.

As mentioned above, for a system operating above a 52.6 GHz carrier frequency, it is envisioned that a single carrier based waveform is needed in order to handle issues including low power amplifier (PA) efficiency and large phase noise. In such cases, as noted previously, when DFT-s-OFDM is used for the transmission of PBCH, SSB pattern and PBCH need to be redesigned.

Embodiments of synchronization signal block (SSB) pattern for a DFT-s-OFDM waveform for system operating above a 52.6 GHz carrier frequency are provided as will be described below.

In one embodiment, a DFT-s-OFDM waveform may be employed for the transmission of PBCH. Further, PBCH and associated demodulation reference signal (DM-RS) may be multiplexed in a time division multiplexing (TDM) manner. Note that PBCH can span K1 symbol(s) and its associated DMRS can span K2 symbols(s), where K1 and K2 are constants, e.g., K1=K2=1 or 2. Further, PBCH and its associated DMRS can occupy N1 PRBs and PSS/SSS can occupy N2 PRBs, where N1 and N2 are constant. N1 and N2 may be same or different. In one example, if K1=K2=1, then N1=36. In another example, if K1=1 and K2=2, then N1=18.

Figure 2:
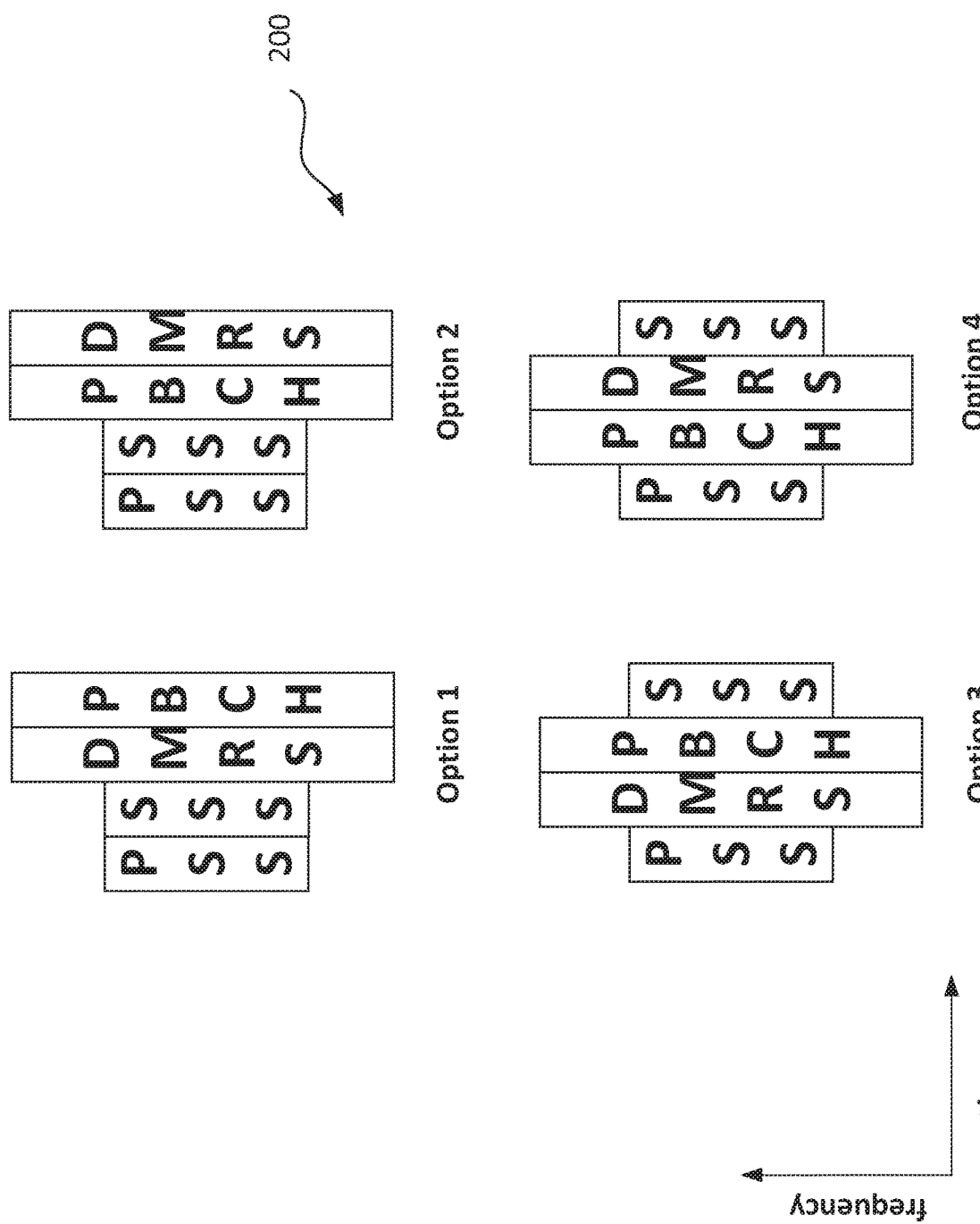
FIG. 2 illustrates a diagram showing examples of SSB patterns according to a first embodiment.

FIG. 2 illustrates a diagram 200 showing examples of SSB patterns when PBCH and DMRS span 2 symbols and have a different bandwidth as compared with the bandwidth PSS/SSS according to some embodiments. In the examples denoted Option 1, Option 2, Option 3 and Option 4, PBCH may span one symbol and DMRS for PBCH may be transmitted before (Option 1) or after (Option 2) PBCH. Further, SSS may be transmitted before (Options 1 and 2) or after (Options 3 and 4) PBCH and its associated DMRS. Note that other permutation of PSS/SSS and PBCH/DMRS may not be limited to the examples of FIG. 2.

Figure 3:
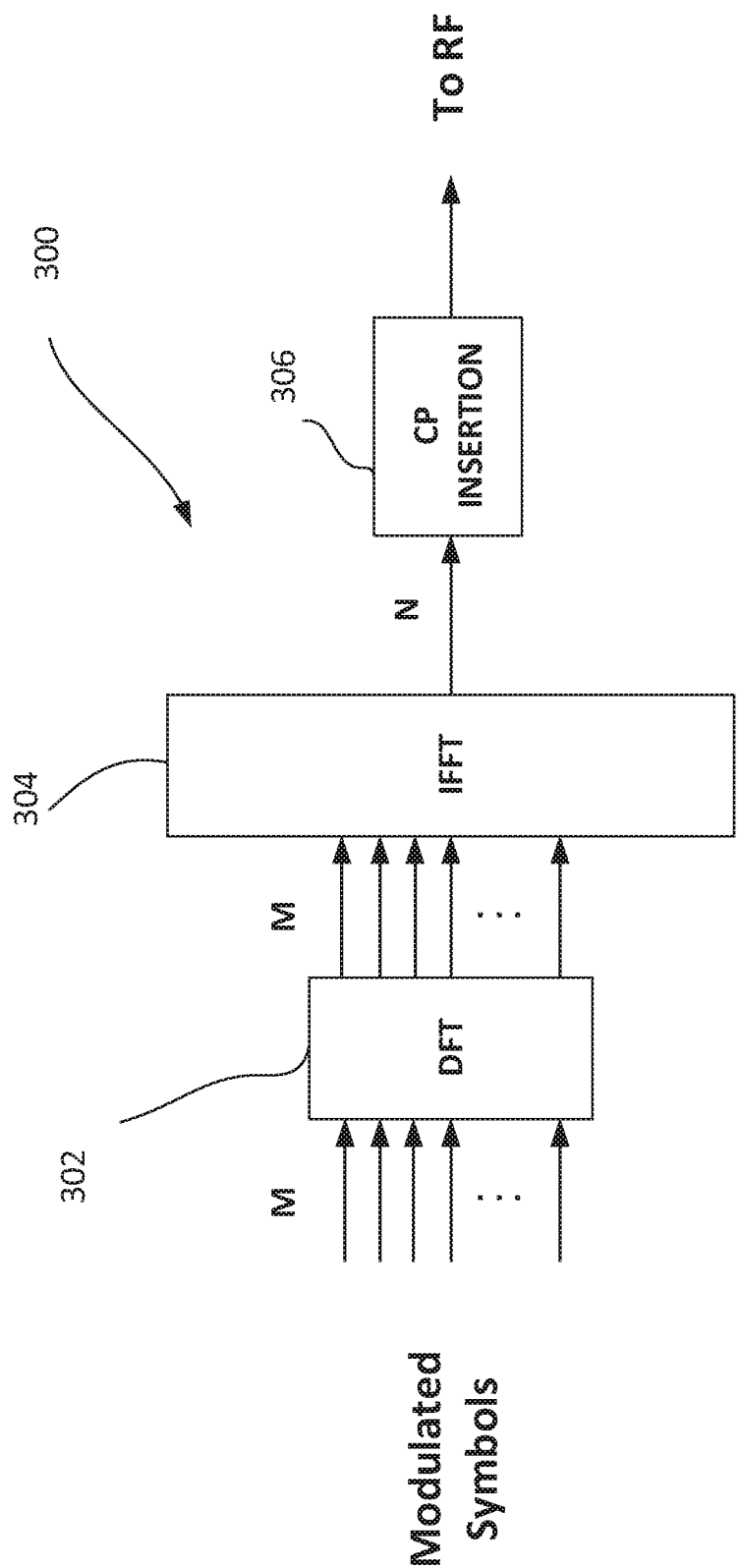
FIG. 3 illustrates a DFT-s-OFDM flow for the transmission of PBCH according to some embodiments.

FIG. 3 illustrates a DFT-s-OFDM flow 300 for the transmission of PBCH according to some embodiments. As shown in FIG. 3, modulated symbols M1 may first be subjected to a DFT spread at 302 to generate DFT spread modulated symbols M2, which may in turn be subjected to an Inverse Fast Fourier Transform (IFFT) operation at 304 to generate time domain symbols in N. Time domain symbols in N may undergo Cyclic Prefix (CP) insertion at 306 before being sent for transmission to a Radio Frequency (RF) interface. The operations shown in FIG. 3 may take place at least in part or fully in a baseband processing circuitry, for example in baseband processing circuitry as shown by way of example in FIGS. 11 and 12 below. The operations shown in the flow of FIG. 3 may be applicable to any of the embodiments shown and described herein.

Figure 4:
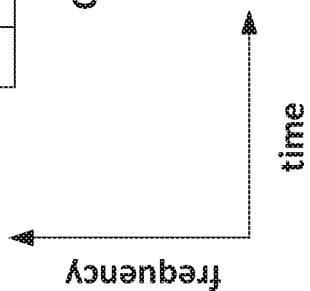
FIG. 4 illustrates a diagram showing examples of SSB patterns according to a second embodiment.

FIG. 4 illustrates a diagram 400 showing examples of SSB patterns when PBCH and DMRS span 3 symbols (with PBCH occupying 2 of the 3 symbols) and have a same bandwidth as PSS/SSS according to some embodiments. In FIG. 4, Options 1, 2 and 3 show SSS occurring before the PBCH and DMRS, while Options 4, 5, and 6 show SSS after the PBCH and DMRS. In all options, PSS leads in the time domain. In the embodiments of FIG. 4, Options 1-6, similar to NR in Rel-15, some unused Resource Elements (REs) may be reserved on each side of the PSS and SSS transmission in the frequency domain in the case where the length of PSS/SSS in the frequency domain is less than the number of REs allocated for PSS/SSS. In the examples shown in FIG. 4, DMRS for PBCH may be transmitted before (Options 1 and 4) or after PBCH (Options 3 and 6), or it may break the PBCH into two parts (Options 2 and 5). Further, as shown, a same bandwidth may be allocated for the transmission of PBCH/DMRS and PSS/SSS.

Figure 5:
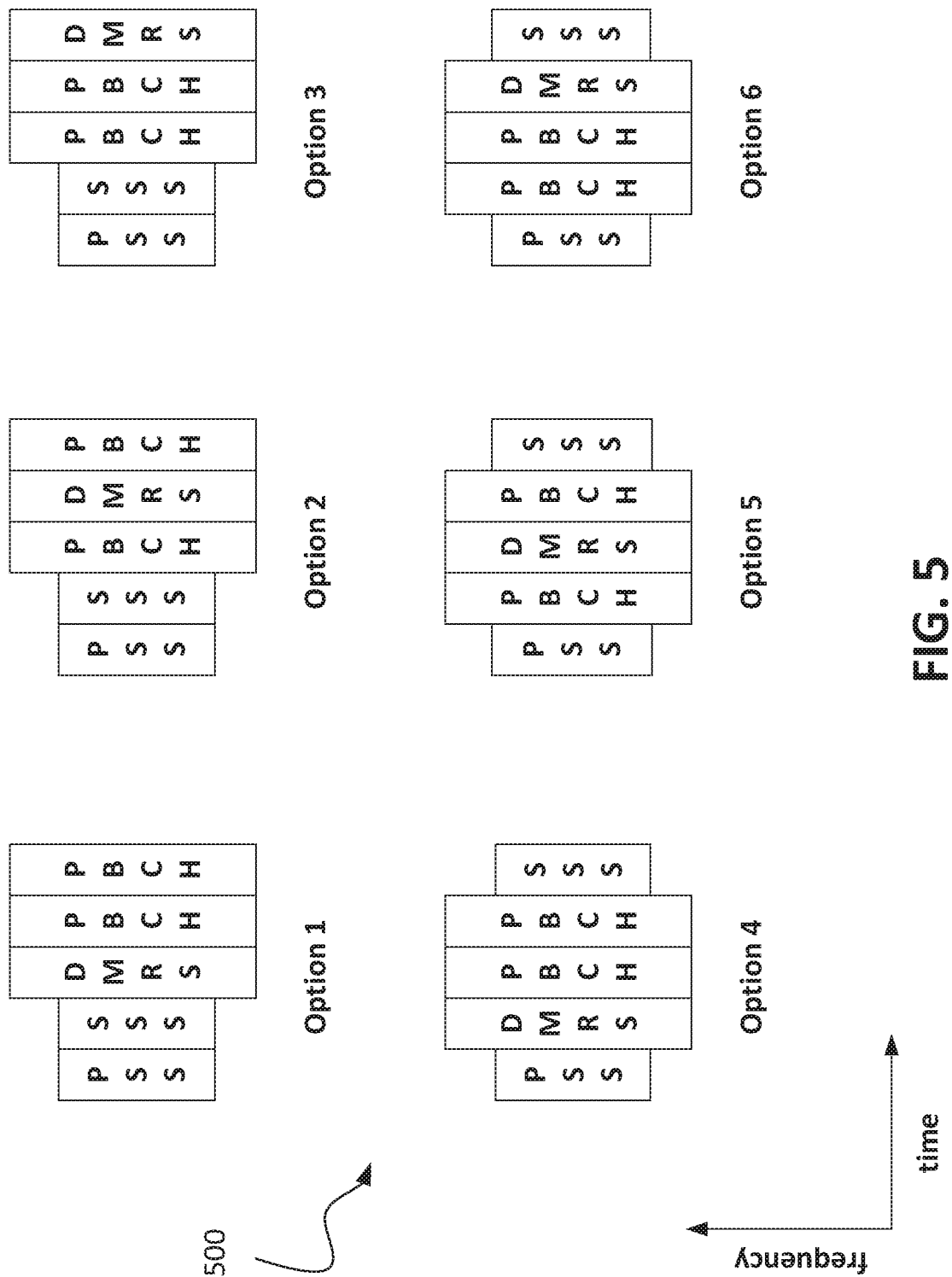
FIG. 5 illustrates a diagram showing examples of SSB patterns according to a third embodiment.

FIG. 5 illustrates a diagram 500 showing examples of SSB patterns when PBCH and DMRS span 3 symbols and have different bandwidths from PSS/SSS. Options 1-6 of FIG. 5 correspond respectively to Options 1-6 of FIG. 4 described above, except for the fact that the PSS and SSS in FIG. 5 have smaller bandwidths than their counterparts in the Options of FIG. 4.

According to other embodiments, where a DFT-s-OFDM waveform is used for DL transmissions for systems operating above 52.6 GHz in a NR network, SSB may not be multiplexed with other DL signals/channels in a frequency division multiplexing (FDM) manner. In other words, power boosting may be applied for the transmission of PSS/SSS and PBCH, which would need time division multiplexing (TDM) instead.

Figure 6:
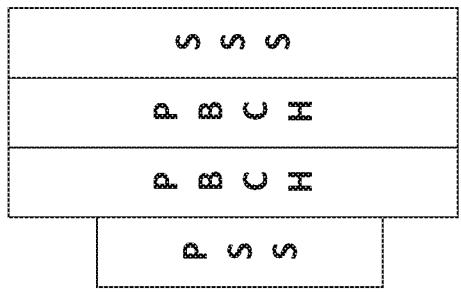
FIG. 6 illustrates a diagram showing examples of SSB patterns according to a fourth embodiment.
Figure 6:
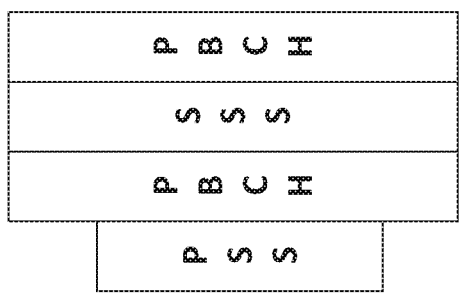
Figure 6:
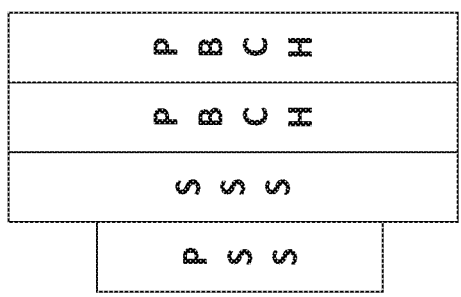
Figure 6:
Figure 7:
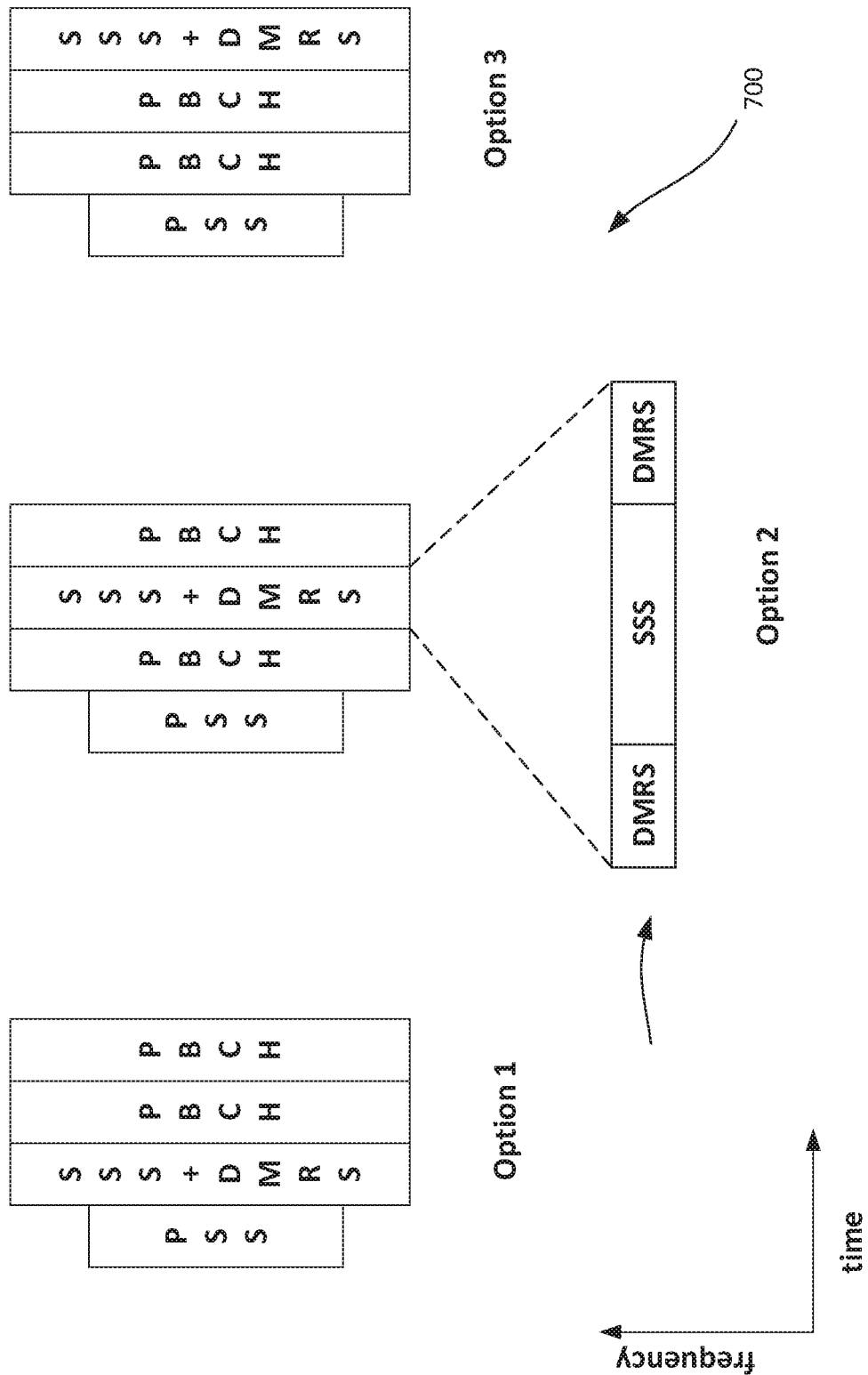
FIG. 7 illustrates a diagram showing examples of SSB patterns according to a fifth embodiment.

According to further embodiments, such as shown by way of example in FIGS. 6 and 7, similar to SSB patterns as defined in Rel-15 NR, a number of symbols allocated for SSB for carrier frequencies above 52.6 GHz may be 4.

In particular, as shown by way of example in FIG. 6, DMRS may not be present for associated PBCH transmission in the SSB but the channel for the PBCH may be estimated by the UE from the SSS. The UE may first detect the SSS and estimate the channel for the PBCH decoding. In this case, a same frequency resource may be allocated for the transmission of SSS and PBCH. Further, in this option, SSS may be used to carry both a SSB time index and partial cell ID information.

FIG. 6 illustrates a diagram 600 showing examples of SSB patterns for instances when SSS is used as DMRS for PBCH as noted above. In the examples, PBCH spans 2 symbols and SSS and PBCH occupy the same number of PRBs in the frequency domain, while PSS may occupy a lesser number of PRBs than SSS and PBCH. With respect to the time domain, Option 1 shows the SSS as leading the PBCH, Option 2 showing SSS as between the two symbols for the PBCH, and Option 3 showing SSS as tailing the PBCH. According to one embodiment, PBCH may span K1 symbol(s), e.g., K1=2. Further, SSS and PBCH may span N1 PRBs, e.g., N1=18 or 20. In one option, when N1 is less than 20 PRBs, unused PRBs or subcarriers may be reserved with zero power, which can match the SSB as defined in Rel-15 NR.

FIG. 7 illustrates a diagram 700 according to some embodiments showing examples of SSB patterns for instances when, similar to SSB pattern as defined in Rel-15 NR, the number of symbols allocated for SSB for above 52.6 GHz may be 4. Here, examples of SSS patterns are shown when SSS and DMRS together in one symbol are used for channel estimation of PBCH. In the example, PBCH spans 2 symbols. SSS/DMRS and PBCH occupy same number of PRBs in frequency domain. Options 1-3 of FIG. 7 correspond respectively to Options 1-3 of FIG. 6 described above, except for the fact that the SSS in FIG. 6 does not have DMRS signals time multiplexed therein, contrary to its counterpart in Options 1-3 of FIG. 7, which does in fact include a SSS and DMRS time multiplexed with respect to one another. Thus, in the embodiment of FIG. 7, DMRS and SSS may be allocated in the same symbol and multiplexed in a time division multiplexing (TDM) manner prior to DFT operation. As shown by way of example in the context of Option 2 in FIG. 7, the DMRS signals may lead and end the SSS+DMRS symbol, with SSS signals being between the DMRS leading and ending signals in the time domain. However, embodiments are not so limited, and may include other manners of time multiplexing SSS and DMRS with one another. Similar to the embodiment of FIG. 6, a same frequency resource may be allocated for SSS+DMRS and PBCH according to one embodiment. According to one embodiment, in FIG. 7, DMRS may be used to carry the SSB time index and SSS may be used to carry partial cell identification (ID) information.

DMRS Design for PBCH for a Frequency Above 52.6 GHz

As mentioned above, to reduce PAPR for system operating above a 52.6 GHz carrier frequency, a DFT-s-OFDM based waveform may be applied for DL transmission. In this case, DMRS with a low PAPR property may need to be considered.

Embodiments of DMRS design for PBCH for systems operating above a 52.6 GHz carrier frequency are provided below.

According to one embodiment, a Zadoff-Chu (ZC) sequence may be used for DM-RS sequence generation. In particular, the root index and/or cyclic shift of a ZC sequence for DMRS sequence generation may be defined as a function of one or more the following parameters: cell ID, partial or full SSB index, or half radio frame index. In one example, the root index of the ZC sequence may be defined as a function of cell ID, partial or full SSB index and/or half radio frame index. In addition, the cyclic shift of the ZC sequence may be predefined in the NR specification, e.g., fixed to 0.

According to another embodiment, the root index of the ZC sequence may be defined as a function of cell ID. In addition, the cyclic shift of the ZC sequence may be defined as a function of partial or full SSB index and/or half radio frame index. In yet another embodiment, only a part of cell ID may be used to define the root index of the ZC sequence and the rest of cell ID may be used to define the cyclic shift of this ZC sequence possibly together with other parameters such as SSB index and half radio frame index.

According to another embodiment, maximum (max) length sequence (m-sequence) or Gold code sequence modulated using pi/2-BPSK modulation may be used as the DMRS sequence. In this case, an expression of the initialization value of the linear feedback shift register (LFSR), used for generation of m-sequences or Gold codes, may include at least cell ID. In some examples, the initialization value may be based on the full SSB index and/or half radio frame index or a part of the SSB index and/or half radio frame index in addition to the cell ID. In other examples, different cyclic shifts of the m-sequence or Gold code sequence may be used for different SSB indices and/or half radio frame indices.

According to another embodiment, a Bjorck Constant Amplitude Zero Auto Correlation (CAZAC) sequence may be used as the DMRS sequence. In this case, different cyclic shifts of the Bjorck CAZAC sequence may correspond to different combinations of cell ID, part of SSB index or full SSB index and/or half radio frame.

Figure 8:
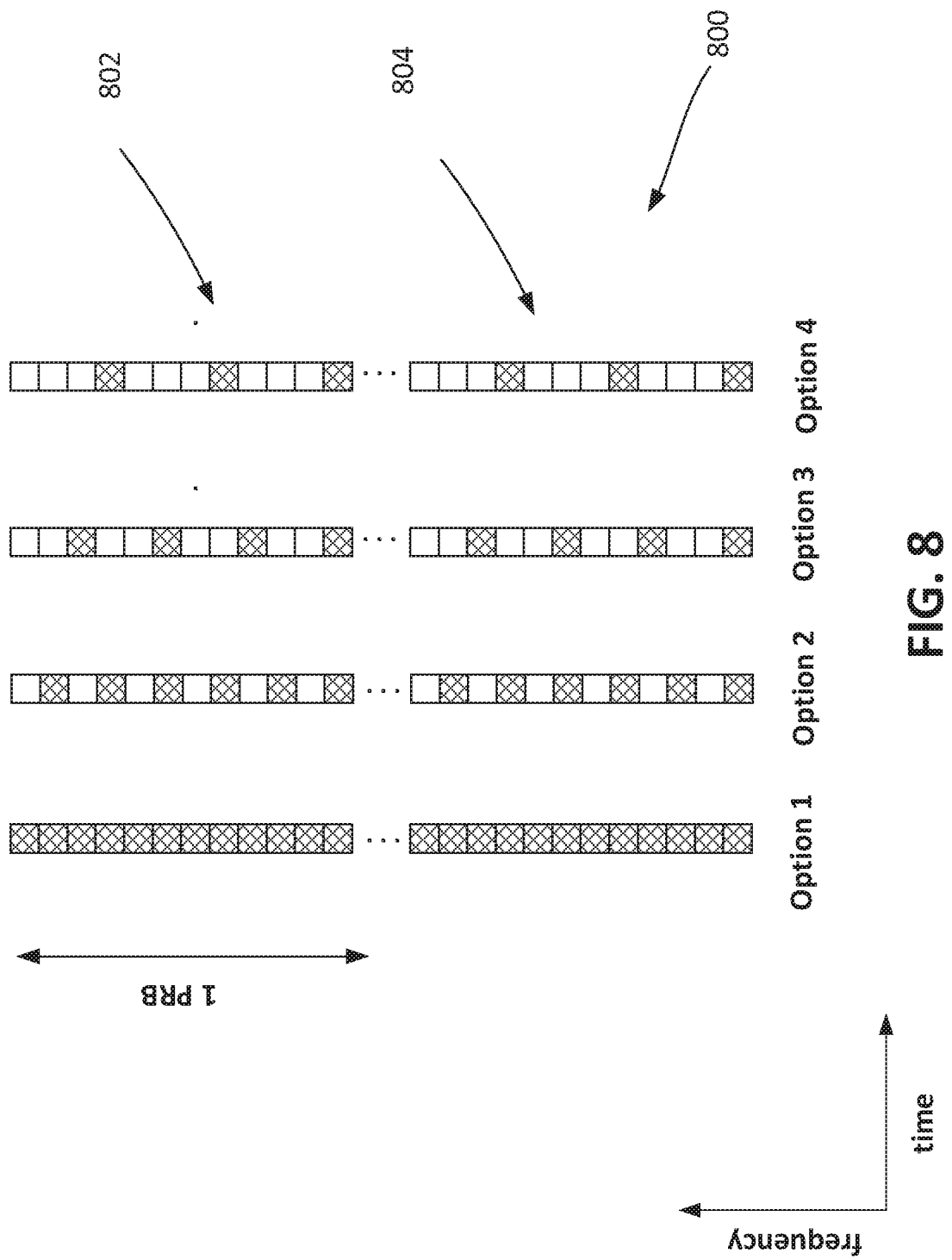
FIG. 8 illustrates a diagram showing examples of Demodulation Reference Signal (DMRS) patterns for PBCH according to some embodiments.

FIG. 8 illustrates a diagram 800 showing examples of DMRS patterns for PBCH according to some embodiments. Diagram 800 includes two sets 802 and 804 of differing DMRS patterns separated from each other in the frequency domain (as shown by dots separating set 802 from set 804). This is because the DMRS locations move long the frequency domain as a physical cell identification (ID) changes. As shown by way of example in FIG. 8, the DMRS may occupy K REs within one PRB, such as, by way of example only, K=3 (Option 4), 4 (Option 3), 6 (Option 2), 12 (Option 1). In FIG. 8, each square represents a RE, each cross-hatched square represents a DMRS RE, and each non-cross-hatched square represents an unused RE. When DMRS does not fully occupy a whole PRB, the remaining REs of that PRB may be unused and in this case, power boosting may be applied to the REs containing DMRS signals. In other words, the relative power between DMRS and PBCH may be 10 log 10(12/K)dB.

Similar to NR Rel-15, different cells may use different DMRS REs for DMRS transmission. In particular, frequency shift for DMRS REs may be $v_{shift}=N_{ID}^{Cell} \mod(12/K)$.

According to another embodiment, a sequence of DMRS for PBCH may be determined by cell ID and/or SSB timing index. The SSB timing index may be used by the UE to infer the location of the said SSB within the frame boundary. The SSB timing index may be also be used by the UE to determine the Tx beam identification for measurement reporting purposes. If the bits required for the SSB timing index are large, only a portion of the SSB timing index may be used to determine the sequence of DMRS.

According to some embodiments, the above DMRS sequence design may be applied for SSS sequence design as well. Such a scenario may be considered when SSS is used for channel estimation for the PBCH decoding, such as the cases shown in the embodiments of FIG. 6.

Figure 9:
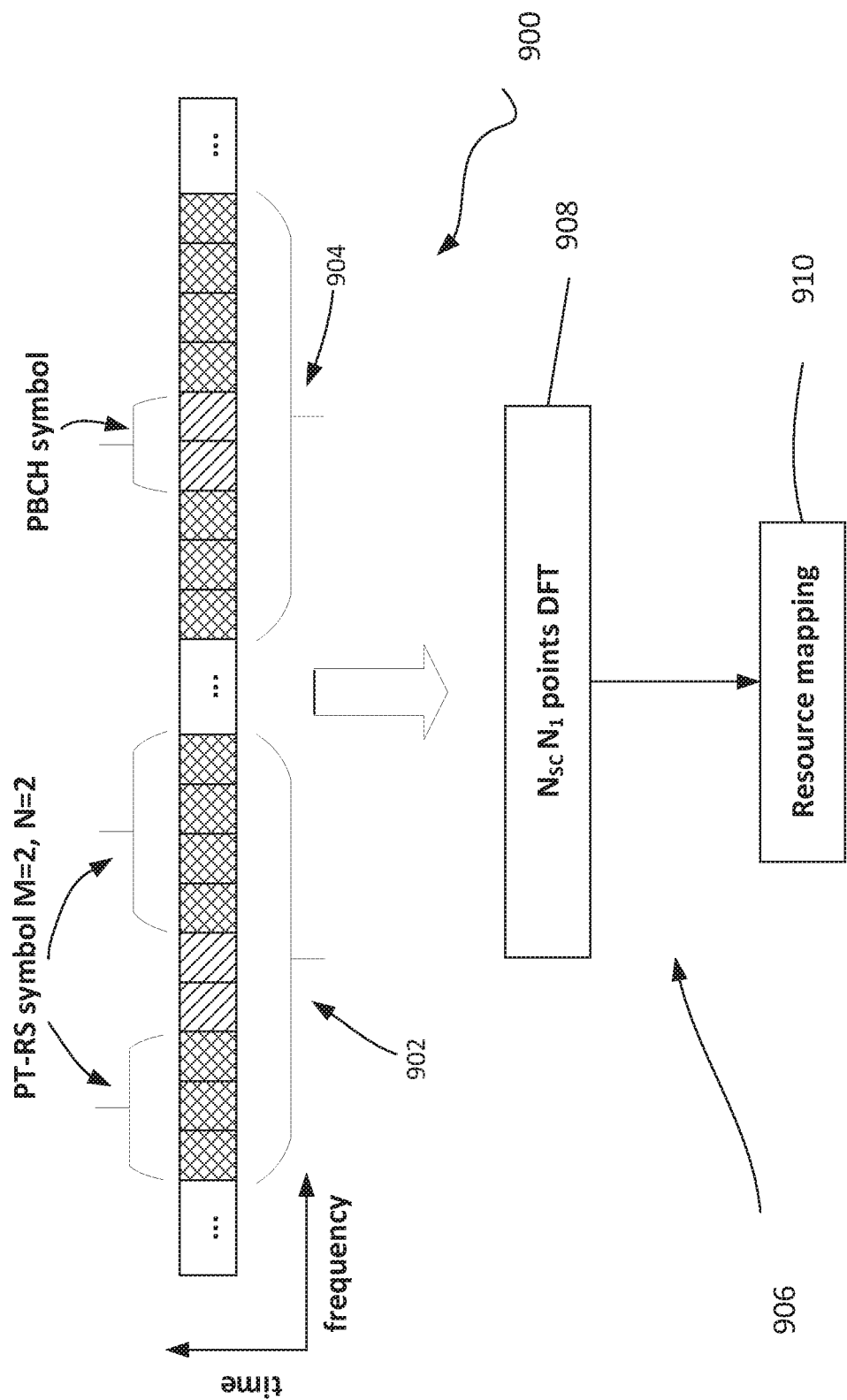
FIG. 9 illustrates an embodiment of time division multiplexing a Phase Tracking Reference Signal (PT-RS) and a PBCH in one PBCH symbol according to some embodiments.
Figure 10:
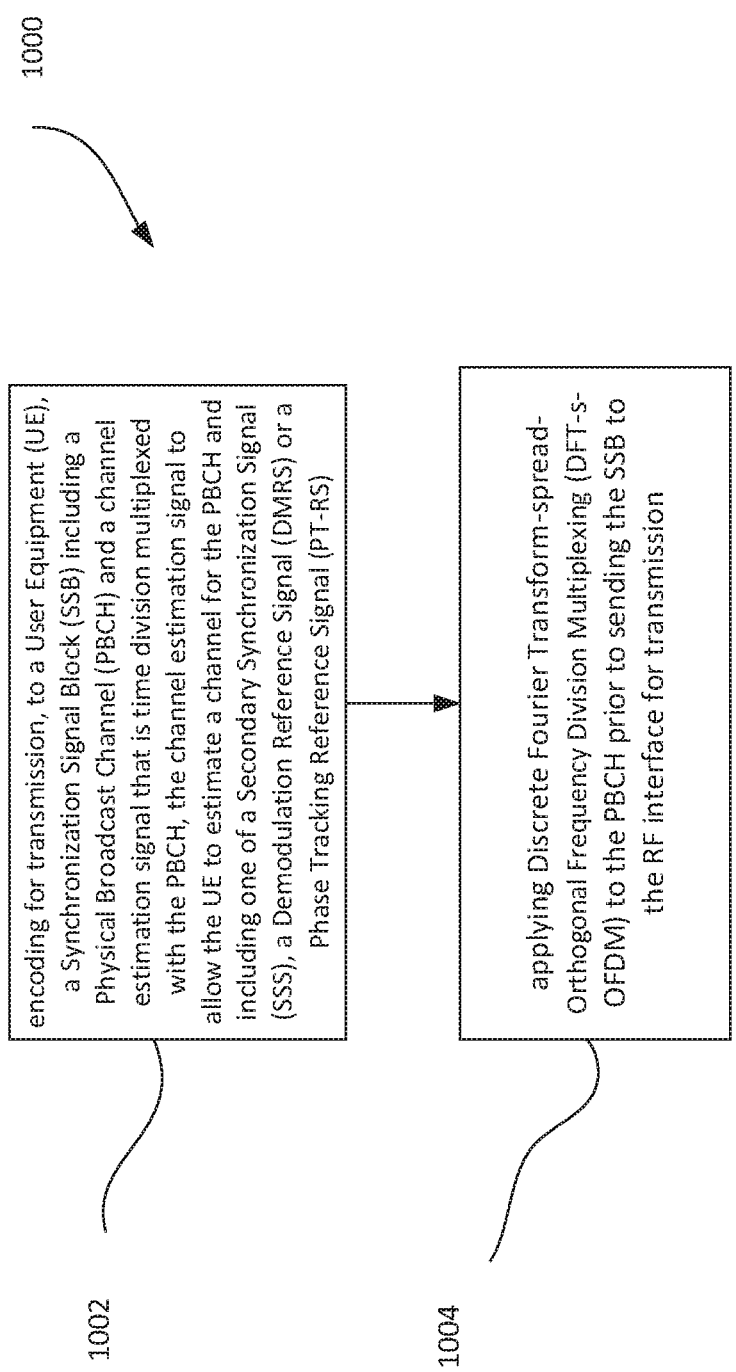
FIG. 10 illustrates a process according to embodiments.

According to another embodiment as shown by way of example in FIG. 9, a Phase Tracking Reference Signal (PT-RS) and PBCH may be multiplexed in the time domain in one PBCH symbol. Here, the diagram 900 includes two sets of symbols 902 and 904. Each of the symbols 902/904 includes a PT-RS symbol and a PBCH symbol, which PBCH symbol includes PBCH signals on each side, in the frequency domain, of the PT-RS symbol. The PT-RS may be multiplexed in a uniform or non-uniform manner. In the embodiment of FIG. 9, PT-RS signals may thus be time division multiplexed with PBCH signals before a DFT process 906 in order to assist in phase shift compensation for PBCH decoding on the UE side. DFT process 906 of diagram 900 may include, for example, a $N_{SC}N_1$ points DFT process at 908, followed by resource mapping 910 as shown, where Nsc indicates the number of subcarriers per Resource Block (RB). In addition, there may be N, e.g. N=2, PT-RS groups (with each group including a PTRS symbol and corresponding PBCH symbol in an OFDM symbol), where each group includes M, e.g. M=2, consecutive symbols. The sequence of PT-RS may be generated based on Pi/2 BPSK, which may be scrambled based on cell ID and/or symbol/slot index.

Referring to FIG. 1000, a process 1000 according to one embodiment includes at operation 1002, encoding for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including one of a Secondary Synchronization Signal (SSS), a Demodulation Reference Signal (DMRS) or a Phase Tracking Reference Signal (PT-RS). At operation 1004, the process 1000 includes applying Discrete Fourier Transform-spread-Orthogonal Frequency Division Multiplexing (DFT-s-OFDM) to the PBCH prior to sending the SSB to the RF interface for transmission. The channel estimation signal may, according to some embodiments, include a DMRS (FIGS. 2, 4, 5, 7 and 8), a SSS without a DMRS (FIG. 6) or a PT-RS (FIG. 9).

Figure 11:
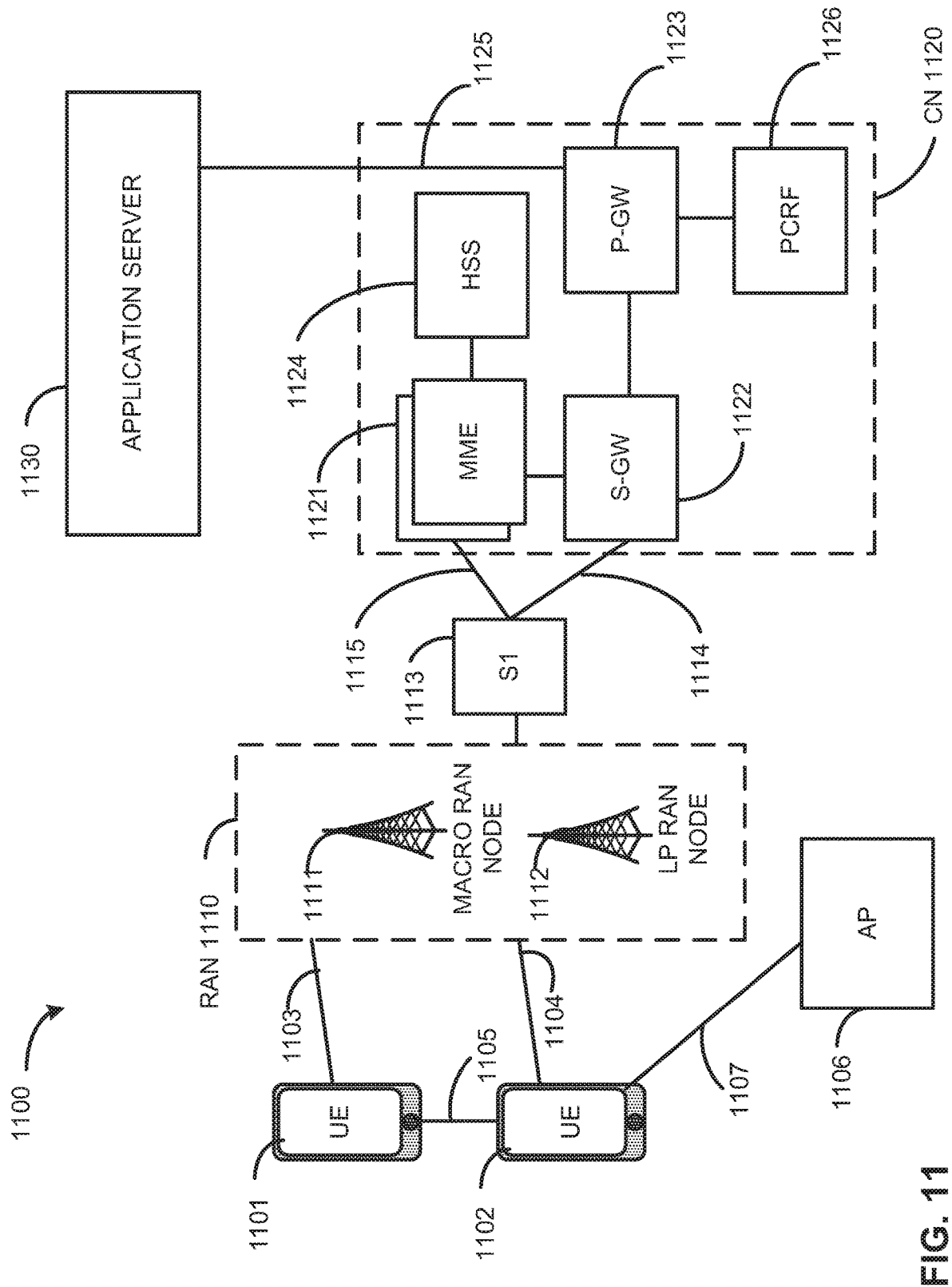
FIG. 11 illustrates an architecture of a system of a network according to some embodiments.

FIG. 11 illustrates an architecture of a system 1100 of a network according to some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks) but may also comprise any mobile or non-mobile computing device.

The UEs 1101 and 1102 may be configured to connect, e.g., communicatively couple, with a radio access network (RAN) 1110. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling and may be consistent with cellular communications protocols.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 may comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 may include one or more access nodes that enable the connections 1103 and 1104. These access nodes (ANs) may be referred to as base stations (BSs), NodeBs, evolved NodeBs (eNBs), next Generation or New Radio evolved NodeBs (gNodeB), RAN nodes, and so forth, and may comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

According to some embodiments, the UEs 1101 and 1102 may be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may comprise a plurality of orthogonal subcarriers.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signalling interface between the RAN nodes 1111 and 1112 and MMEs 1121.

The CN 1120 includes network elements. The term "network element" may describe a physical or virtualized equipment used to provide wired or wireless communication network services. In this embodiment, the CN 1120 comprises, as network elements, the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN).

Figure 12:
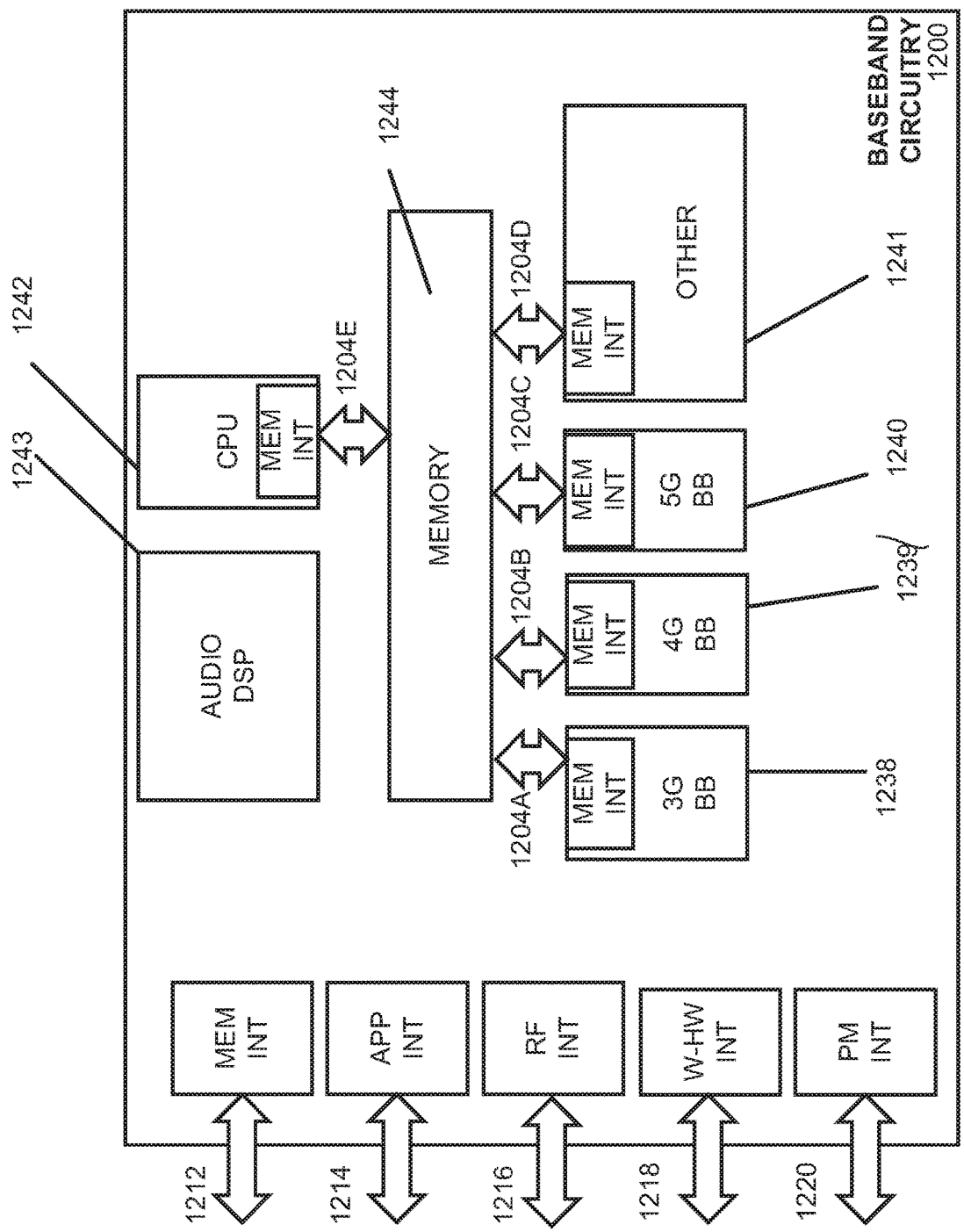
FIG. 12 illustrates example interfaces of baseband circuitry according to various embodiments.

FIG. 12 illustrates example interfaces of baseband circuitry according to various embodiments. The baseband circuitry 1200 may be included in a UE or gNodeB, for example, in UE or gNodeB of FIG. 11, and may comprise processors 1238-1242 and a memory 1244 utilized by said processors. Each of the processors 1238-1232 may include a memory interface, 1204A-1204E, respectively, to send/receive data to/from the memory 1244. Baseband circuitry 1200 may also include an audio digital signal processor (Audio DSP) 1243.

The baseband circuitry 1200 may further include one or more interfaces to communicatively couple to other circuitries/devices, such as a memory interface 1212 (e.g., an interface to send/receive data to/from memory external to the baseband circuitry 1200), an application circuitry interface 1214 (e.g., an interface to send/receive data to/from an application circuitry), an RF circuitry interface 1216 (e.g., an interface to send/receive data to/from an RF circuitry), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from a power management integrated circuit (PMIC).

The components of FIGS. 11 and/or 12, such as the shown UEs and gNodeB's, may be used in any of the embodiments described herein.

The examples set forth herein are illustrative and not exhaustive.

Example 1 includes a device of a New Radio (NR) User Equipment (UE), the device including a Radio Frequency (RF) interface, and processing circuitry coupled to the RF interface, the processing circuitry to: encode for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including one of a Secondary Synchronization Signal (SSS), a Demodulation Reference Signal (DMRS) or a Phase Tracking Reference Signal (PT-RS); and apply Discrete Fourier Transform-spread-Orthogonal Frequency Division Multiplexing (DFT-s-OFDM) to the PBCH prior to sending the SSB to the RF interface for transmission.

Example 2 includes the subject matter of Example 1, and optionally, wherein the processing circuitry is to encode the SSB for transmission on carrier frequencies above 52.6 GHz in a single carrier (SC) waveform.

Example 3 includes the subject matter of Example 1, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 4 includes the subject matter of Example 3, and optionally, wherein K1 and K2=1, or K1=2 and K2=1.

Example 5 includes the subject matter of Example 1, and optionally, wherein the channel estimation signal comes before, after or in the middle of the PBCH in a time domain.

Example 6 includes the subject matter of Example 1, and optionally, wherein the processing circuitry is further to apply an Inverse Fast Fourier Transform (IFFT) and a Cyclic Prefix (CP) insertion to the SSB after applying the DFT-s-OFDM and prior to sending the SSB to the RF interface for transmission.

Example 7 includes the subject matter of Example 3, and optionally, wherein the SSB includes a SSS not corresponding to the channel estimation signal, and the channel estimation signal includes the DMRS.

Example 8 includes the subject matter of Example 7, and optionally, wherein the SSS not corresponding to the channel estimation signal is time division multiplexed with the DMRS in a same symbol.

Example 9 includes the subject matter of Example 8, and optionally, wherein the same symbol includes signals of the DMRS on each side, in a time domain, of signals of the SSS not corresponding to the channel estimation signal.

Example 10 includes the subject matter of Example 3, and optionally, wherein the channel estimation signal includes the SSS, and K1=K2.

Example 11 includes the subject matter of Example 10, and optionally, wherein the SSS includes both a SSB time index for the SSB, and partial cell identification (ID) information.

Example 12 includes the subject matter of Example 1, and optionally, wherein the processing circuitry is to use one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC) to generate the channel estimation signal in the SSB.

Example 13 includes the subject matter of Example 1, and optionally, wherein the processing circuitry is to generate the channel estimation signal in the SSB based on at least one of cell identification (ID) or SSB timing index.

Example 14 includes the subject matter of Example 1, and optionally, further including a front end module coupled to the RF interface.

Example 15 includes the subject matter of Example 14, and optionally, further including one or more antennas coupled to the front end module to transmit the SSB.

Example 16 includes a method to be performed at a device of a New Radio (NR) evolved Node B (gNodeB), the method including: encoding for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including one of a Secondary Synchronization Signal (SSS), a Demodulation Reference Signal (DMRS) or a Phase Tracking Reference Signal (PT-RS); and applying Discrete Fourier Transform-spread-Orthogonal Frequency Division Multiplexing (DFT-s-OFDM) to the PBCH prior to sending the SSB for transmission.

Example 17 includes the subject matter of Example 16, and optionally, further including encoding the SSB for transmission on carrier frequencies above 52.6 GHz in a single carrier (SC) waveform.

Example 18 includes the subject matter of Example 16, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 19 includes the subject matter of Example 18, and optionally, wherein K1 and K2=1, or K1=2 and K2=1.

Example 20 includes the subject matter of Example 16, and optionally, wherein the channel estimation signal comes before, after or in the middle of the PBCH in a time domain.

Example 21 includes the subject matter of Example 16, and optionally, further including applying an Inverse Fast Fourier Transform (IFFT) and a Cyclic Prefix (CP) insertion to the SSB after applying the DFT-s-OFDM and prior to sending the SSB for transmission.

Example 22 includes the subject matter of Example 18, and optionally, wherein the SSB includes a SSS not corresponding to the channel estimation signal, and the channel estimation signal includes the DMRS.

Example 23 includes the subject matter of Example 22, and optionally, wherein the SSS not corresponding to the channel estimation signal is time division multiplexed with the DMRS in a same symbol.

Example 24 includes the subject matter of Example 23, and optionally, wherein the same symbol includes signals of the DMRS on each side, in a time domain, of signals of the SSS not corresponding to the channel estimation signal.

Example 25 includes the subject matter of Example 18, and optionally, wherein the channel estimation signal includes the SSS, and K1=K2.

Example 26 includes the subject matter of Example 25, and optionally, wherein the SSS includes both a SSB time index for the SSB, and partial cell identification (ID) information.

Example 27 includes the subject matter of Example 16, and optionally, further including using one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC) to generate the channel estimation signal in the SSB.

Example 28 includes the subject matter of Example 16, and optionally, further including generating the channel estimation signal in the SSB based on at least one of cell identification (ID) or SSB timing index.

Example 29 includes a device of a New Radio (NR) evolved Node B (gNodeB), the device including: means for encoding for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including one of a Secondary Synchronization Signal (SSS), a Demodulation Reference Signal (DMRS) or a Phase Tracking Reference Signal (PT-RS); and means for applying Discrete Fourier Transform-spread-Orthogonal Frequency Division Multiplexing (DFT-s-OFDM) to the PBCH prior to sending the SSB for transmission.

Example 30 includes the subject matter of Example 29, and optionally, further including encoding the SSB for transmission on carrier frequencies above 52.6 GHz in a single carrier (SC) waveform.

Example 31 includes the subject matter of Example 29, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 32 includes the subject matter of Example 31, and optionally, wherein K1 and K2=1, or K1=2 and K2=1.

Example 33 includes the subject matter of Example 29, and optionally, wherein the channel estimation signal comes before, after or in the middle of the PBCH in a time domain.

Example 34 includes the subject matter of Example 29, and optionally, further including applying an Inverse Fast Fourier Transform (IFFT) and a Cyclic Prefix (CP) insertion to the SSB after applying the DFT-s-OFDM and prior to sending the SSB for transmission.

Example 35 includes the subject matter of Example 31, and optionally, wherein the SSB includes a SSS not corresponding to the channel estimation signal, and the channel estimation signal includes the DMRS.

Example 36 includes the subject matter of Example 35, and optionally, wherein the SSS not corresponding to the channel estimation signal is time division multiplexed with the DMRS in a same symbol.

Example 37 includes the subject matter of Example 36, and optionally, wherein the same symbol includes signals of the DMRS on each side, in a time domain, of signals of the SSS not corresponding to the channel estimation signal.

Example 38 includes the subject matter of Example 29, and optionally, wherein the channel estimation signal includes the SSS, and K1=K2.

Example 39 includes the subject matter of Example 38, and optionally, wherein the SSS includes both a SSB time index for the SSB, and partial cell identification (ID) information.

Example 40 includes the subject matter of Example 29, and optionally, further including using one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC) to generate the channel estimation signal in the SSB.

Example 41 includes the subject matter of Example 29, and optionally, further including generating the channel estimation signal in the SSB based on at least one of cell identification (ID) or SSB timing index.

Example 42 includes a device of a New Radio (NR) User Equipment (UE), the device including a Radio Frequency (RF) interface, and processing circuitry coupled to the RF interface, the processing circuitry to: decode a Synchronization Signal Block (SSB) from a NR evolved Node B (gNodeB) including a Physical Broadcast Channel (PBCH) and a channel estimation signal that is time division multiplexed with the PBCH, the channel estimation signal including one of a Secondary Synchronization Signal (SSS), a Demodulation Reference Signal (DMRS) or a Phase Tracking Reference Signal (PT-RS), the PBCH having a Discrete Fourier Transform-spread-Orthogonal Frequency Division Multiplexing (DFT-s-OFDM) waveform; and estimate a channel for the PBCH based on the channel estimation signal.

Example 43 includes the subject matter of Example 42, and optionally, wherein the SSB is on carrier frequencies above 52.6 GHz in a single carrier (SC) waveform.

Example 44 includes the subject matter of Example 42, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 45 includes the subject matter of Example 44, and optionally, wherein K1 and K2=1, or K1=2 and K2=1.

Example 46 includes the subject matter of Example 42, and optionally, wherein the channel estimation signal comes before, after or in the middle of the PBCH in a time domain.

Example 47 includes the subject matter of Example 42, and optionally, wherein the processing circuitry is further to apply an Inverse Fast Fourier Transform (IFFT) and a Cyclic Prefix (CP) insertion to the SSB after applying the DFT-s-OFDM and prior to sending the SSB to the RF interface for transmission.

Example 48 includes the subject matter of Example 44, and optionally, wherein the SSB includes a SSS not corresponding to the channel estimation signal, and the channel estimation signal includes the DMRS.

Example 49 includes the subject matter of Example 48, and optionally, wherein the SSS not corresponding to the channel estimation signal is time division multiplexed with the DMRS in a same symbol.

Example 50 includes the subject matter of Example 49, and optionally, wherein the same symbol includes signals of the DMRS on each side, in a time domain, of signals of the SSS not corresponding to the channel estimation signal.

Example 51 includes the subject matter of Example 44, and optionally, wherein the channel estimation signal includes the SSS, and K1=K2.

Example 52 includes the subject matter of Example 51, and optionally, wherein the SSS includes both a SSB time index for the SSB, and partial cell identification (ID) information.

Example 53 includes the subject matter of Example 42, and optionally, wherein the processing circuitry is to decode the channel estimation signal using one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC).

Example 54 includes the subject matter of Example 42, and optionally, further including a front end module coupled to the RF interface.

Example 55 includes the subject matter of Example 54, and optionally, further including one or more antennas coupled to the front end module to receive the SSB.

Example 56 includes a method to be performed at a device of a New Radio (NR) User Equipment (UE), the method including: decoding a Synchronization Signal Block (SSB) from a NR evolved Node B (gNodeB) including a Physical Broadcast Channel (PBCH) and a channel estimation signal that is time division multiplexed with the PBCH, the channel estimation signal including one of a Secondary Synchronization Signal (SSS), a Demodulation Reference Signal (DMRS) or a Phase Tracking Reference Signal (PT-RS), the PBCH having a Discrete Fourier Transform-spread-Orthogonal Frequency Division Multiplexing (DFT-s-OFDM) waveform; and estimating a channel for the PBCH based on the channel estimation signal.

Example 57 includes the subject matter of Example 56, and optionally, wherein the SSB is on carrier frequencies above 52.6 GHz in a single carrier (SC) waveform.

Example 58 includes the subject matter of Example 56, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 59 includes the subject matter of Example 58, and optionally, wherein K1 and K2=1, or K1=2 and K2=1.

Example 60 includes the subject matter of Example 56, and optionally, wherein the channel estimation signal comes before, after or in the middle of the PBCH in a time domain.

Example 61 includes the subject matter of Example 56, and optionally, further including applying an Inverse Fast Fourier Transform (IFFT) and a Cyclic Prefix (CP) insertion to the SSB after applying the DFT-s-OFDM and prior to sending the SSB for transmission.

Example 62 includes the subject matter of Example 58, and optionally, wherein the SSB includes a SSS not corresponding to the channel estimation signal, and the channel estimation signal includes the DMRS.

Example 63 includes the subject matter of Example 62, and optionally, wherein the SSS not corresponding to the channel estimation signal is time division multiplexed with the DMRS in a same symbol.

Example 64 includes the subject matter of Example 63, and optionally, wherein the same symbol includes signals of the DMRS on each side, in a time domain, of signals of the SSS not corresponding to the channel estimation signal.

Example 65 includes the subject matter of Example 58, and optionally, wherein the channel estimation signal includes the SSS, and K1=K2.

Example 66 includes the subject matter of Example 65, and optionally, wherein the SSS includes both a SSB time index for the SSB, and partial cell identification (ID) information.

Example 67 includes the subject matter of Example 56, and optionally, further including decoding the channel estimation signal using one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC).

Example 68 includes device of a New Radio (NR) User Equipment (UE), the device including: means for decoding a Synchronization Signal Block (SSB) from a NR evolved Node B (gNodeB) including a Physical Broadcast Channel (PBCH) and a channel estimation signal that is time division multiplexed with the PBCH, the channel estimation signal including one of a Secondary Synchronization Signal (SSS), a Demodulation Reference Signal (DMRS) or a Phase Tracking Reference Signal (PT-RS), the PBCH having a Discrete Fourier Transform-spread-Orthogonal Frequency Division Multiplexing (DFT-s-OFDM) waveform; and means for estimating a channel for the PBCH based on the channel estimation signal.

Example 69 includes the subject matter of Example 68, and optionally, wherein the SSB is on carrier frequencies above 52.6 GHz in a single carrier (SC) waveform.

Example 70 includes the subject matter of Example 68, and optionally, wherein the SSB further includes a Primary Synchronization Signal (PSS), and wherein: the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

Example 71 includes the subject matter of Example 70, and optionally, wherein K1 and K2=1, or K1=2 and K2=1.

Example 72 includes the subject matter of Example 68, and optionally, wherein the channel estimation signal comes before, after or in the middle of the PBCH in a time domain.

Example 73 includes the subject matter of Example 68, and optionally, wherein the processing circuitry is further to apply an Inverse Fast Fourier Transform (IFFT) and a Cyclic Prefix (CP) insertion to the SSB after applying the DFT-s-OFDM and prior to sending the SSB to the RF interface for transmission.

Example 74 includes the subject matter of Example 70, and optionally, wherein the SSB includes a SSS not corresponding to the channel estimation signal, and the channel estimation signal includes the DMRS.

Example 75 includes the subject matter of Example 74, and optionally, wherein the SSS not corresponding to the channel estimation signal is time division multiplexed with the DMRS in a same symbol.

Example 76 includes the subject matter of Example 75, and optionally, wherein the same symbol includes signals of the DMRS on each side, in a time domain, of signals of the SSS not corresponding to the channel estimation signal.

Example 77 includes the subject matter of Example 70, and optionally, wherein the channel estimation signal includes the SSS, and K1=K2.

Example 78 includes the subject matter of Example 77, and optionally, wherein the SSS includes both a SSB time index for the SSB, and partial cell identification (ID) information.

Example 79 includes the subject matter of Example 68, and optionally, wherein the processing circuitry is to decode the channel estimation signal using one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC).

Example 80 includes a machine-readable medium including code which, when executed, is to cause a machine to perform the method of any one of Examples 16-28 and 56-67.

Example 81 includes a product comprising one or more tangible computer-readable non-transitory storage media comprising computer-executable instructions operable to, when executed by at least one computer processor, enable the at least one processor to perform the method of any one of Examples 16-28 and 56-67.

Example 82 includes a method to be performed at a device of a New Radio (NR) evolved Node B, the method including performing the functionalities of the processing circuitry of any one of the Examples above.

Example 83 includes an apparatus comprising means for causing a wireless communication device to perform the method of any one of Examples 16-28 and 56-67.

Example 84 includes a machine-readable medium including code which, when executed, is to cause a machine to perform the method of any one of Examples 16-28 and 56-67.

Example 85 includes a product comprising one or more tangible computer-readable non-transitory storage media comprising computer-executable instructions operable to, when executed by at least one computer processor, enable the at least one computer processor to perform the method of any one of Examples 16-28 and 56-67.

Example 86 includes an apparatus comprising means for causing a wireless communication device to perform the method of any one of Examples 16-28 and 56-67.

Example 87 may include a signal as described in or related to any of the examples above, or portions or parts thereof.

Example 88 may include a signal in a wireless network as shown and described herein.

Example 89 may include a method of communicating in a wireless network as shown and described herein.

Example 90 may include a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A device of a New Radio (NR) evolved Node B (gNodeB), the device including a Radio Frequency (RF) interface, and processing circuitry coupled to the RF interface, the processing circuitry to:
    encode for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including a Demodulation Reference Signal (DMRS), the SSB further including a Secondary Synchronization Signal (SSS) not corresponding to the channel estimation signal, the SSS time division multiplexed with the DMRS in a same symbol; and
    apply Discrete Fourier Transform-spread-Orthogonal Frequency Division Multiplexing (DFT-s-OFDM) to the PBCH prior to sending the SSB to the RF interface for transmission.

2. The device of claim 1, wherein the processing circuitry is to encode the SSB for transmission on carrier frequencies above 52.6 GHz in a single carrier (SC) waveform.

3. The device of claim 1, wherein the SSB further includes a Primary Synchronization Signal (PSS), and wherein:
    the PBCH spans K1 symbols and the channel estimation signal spans K2 symbols, where K1 and K2 are constants and are one of identical or different with respect to one another; and
    the PBCH and the channel estimation signal each span N1 Physical Resource Blocks (PRBs) and the PSS spans N2 PRBs, where N1 and N2 are constants and are one of identical or different with respect to one another.

4. The device of claim 1, wherein the channel estimation signal comes before, after or in the middle of the PBCH in a time domain.

5. The device of claim 1, wherein the same symbol includes signals of the DMRS on each side, in a time domain, of signals of the SSS not corresponding to the channel estimation signal.

6. The device of claim 3, wherein the channel estimation signal includes the SSS and the SSS includes both a partial or full SSB time index for the SSB, and partial cell identification (ID) information.

7. The device of claim 1, wherein the processing circuitry is to use one of a Zadoff-Chu (ZC) sequence, a maximum length sequence (m-sequence) or Gold code sequence modulated using pi/2-Binary Phase Shift Keying (BPSK) modulation, or a Bjorck Constant Amplitude Zero Auto Correlation (CAZAC) to generate the channel estimation signal in the SSB.

8. The device of claim 7, further including a front end module coupled to the RF interface.

9. The device of claim 8, further including one or more antennas coupled to the front end module to transmit the SSB.

10. A method to be performed at a device of a New Radio (NR) evolved Node B (gNodeB), the method including:
    encoding for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including a Demodulation Reference Signal (DMRS), the SSB further including a Secondary Synchronization Signal (SSS) not corresponding to the channel estimation signal, the SSS time division multiplexed with the DMRS in a same symbol; and
    applying Discrete Fourier Transform-spread-Orthogonal Frequency Division Multiplexing (DFT-s-OFDM) to the PBCH prior to sending the SSB for transmission.

11. The method of claim 10, further including encoding the SSB for transmission on carrier frequencies above 52.6 GHz in a single carrier (SC) waveform.

12. The method of claim 10, wherein the SSB further includes a Primary Synchronization Signal (PSS), and wherein:
    the PBCH spans K1 symbols and the channel estimation signal spans K2 symbols, where K1 and K2 are constants and are one of identical or different with respect to one another; and
    the PBCH and the channel estimation signal each span N1 Physical Resource Blocks (PRBs) and the PSS spans N2 PRBs, where N1 and N2 are constants and are one of identical or different with respect to one another.

13. The method of claim 10, wherein the channel estimation signal comes before, after or in the middle of the PBCH in a time domain.

14. The method of claim 10, further including applying an Inverse Fast Fourier Transform (IFFT) and a Cyclic Prefix (CP) insertion to the SSB after applying the DFT-s-OFDM and prior to sending the SSB for transmission.

15. The method of claim 12, wherein the channel estimation signal includes the SSS, and K1=K2.

16. The method of claim 15, wherein the SSS includes both a partial or full SSB time index for the SSB, and partial cell identification (ID) information.

17. One or more tangible computer-readable non-transitory storage media comprising computer-executable instructions operable to, when executed by at least one computer processor of a New Radio (NR) evolved Node B (gNodeB), enable the at least one computer processor to perform operations including:

encoding for transmission, to a User Equipment (UE), a Synchronization Signal Block (SSB) including a Physical Broadcast Channel (PBCH) and a channel estimation signal that is time division multiplexed with the PBCH, the channel estimation signal to allow the UE to estimate a channel for the PBCH and including a Demodulation Reference Signal (DMRS), the SSB further including a Secondary Synchronization Signal (SSS) not corresponding to the channel estimation signal, the SSS time division multiplexed with the DMRS in a same symbol; and applying Discrete Fourier Transform-spread-Orthogonal Frequency Division Multiplexing (DFT-s-OFDM) to the PBCH prior to sending the SSB for transmission.

18. The storage media of claim 17, the operations further including encoding the SSB for transmission on carrier frequencies above 52.6 GHz in a single carrier (SC) waveform.

19. The storage media of claim 17, wherein the SSB further includes a Primary Synchronization Signal (PSS), and wherein:

the PBCH spans K1 symbols and the channel estimation signal spans K2 symbols, where K1 and K2 are constants and are one of identical or different with respect to one another; and the PBCH and the channel estimation signal each span N1 Physical Resource Blocks (PRBs) and the PSS spans N2 PRBs, where N1 and N2 are constants and are one of identical or different with respect to one another.

20. The storage media of claim 17, the operations further including applying an Inverse Fast Fourier Transform (IFFT) and a Cyclic Prefix (CP) insertion to the PBCH after applying the DFT-s-OFDM and prior to sending the SSB for transmission.

* * * * *